(12) United States Patent
Peters et al.

(10) Patent No.: US 12,422,866 B2
(45) Date of Patent: Sep. 23, 2025

(54) FAULT TOLERANT FLIGHT CONTROL ARCHITECTURE

(71) Applicant: Textron Innovations Inc., Providence, RI (US)

(72) Inventors: Russell Peters, Fort Worth, TX (US); Eric Covington, Fort Worth, TX (US); Aaron Hitchcock, Fort Worth, TX (US); John Robert Wittmark, Jr., Newark, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 121 days.

(21) Appl. No.: 18/533,932

(22) Filed: Dec. 8, 2023

(65) Prior Publication Data
US 2025/0187722 A1    Jun. 12, 2025

(51) Int. Cl.
*G05D 1/87* (2024.01)
*B64C 13/50* (2006.01)
*G05D 1/85* (2024.01)
*G05D 109/20* (2024.01)

(52) U.S. Cl.
CPC .............. *G05D 1/87* (2024.01); *B64C 13/503* (2013.01); *G05D 1/85* (2024.01); *G05D 2109/20* (2024.01)

(58) Field of Classification Search
None
See application file for complete search history.

(56) References Cited

U.S. PATENT DOCUMENTS

| | | | |
|---|---|---|---|
| 5,550,736 A * | 8/1996 | Hay | G06F 11/184 714/E11.061 |
| 2025/0138559 A1 * | 5/2025 | Falzone | G05D 1/87 |

* cited by examiner

*Primary Examiner* — Peter D Nolan
*Assistant Examiner* — Michael F Whalen
(74) *Attorney, Agent, or Firm* — SLATER MATSIL, LLP (57) ABSTRACT

A flight control system, including a flight control computer (FCC) configured for providing a first and second flight function, and sending, to effectors of an aircraft, first command signals based on the first and second flight functions, and a second computer configured for providing one or more autonomy functions associated with operation of the aircraft, and that are different from the first and second flight functions, monitoring operation of the FCC, determining whether the FCC has failed, and providing a fail-safe mode for at least the first flight function in response to determining that the FCC has failed. Providing the fail-safe mode includes providing one or more critical flight functions that includes the first flight function, and sending, to the effectors, second command signals that replace a first command signal associated with the first flight function and that are based on the critical flight functions.

20 Claims, 4 Drawing Sheets

FAULT TOLERANT FLIGHT CONTROL ARCHITECTURE

TECHNICAL FIELD

The present invention relates generally to a system and method for providing a redundant flight control architecture, and, in particular embodiments, to a system and method for providing fail-safe features or fail-safe modes, for control systems for an autonomous vehicle, with a flight control computer having a second computer with non-primary flight control functions as a primary function as a backup for the flight control computer to avoid implementing multiple flight control computers.

BACKGROUND

As aircraft such as rotorcraft, fixed wing aircraft, drones, and the like, become more automated, requirements for the safety of the automated systems has increased. Safety considerations frequently include redundant flight control systems to ensure that a failure in one flight control system is not catastrophic. Traditional redundant flight control systems require multiple sets of hardware with each set providing the same function as the first. Thus, if one set of flight control systems fails, another set of flight control systems will take over. This adds weight, consumes space and power and serves no additional function other than increased reliability. Additionally, the extra components of the redundant flight control systems add recurring cost and increases sustainment costs.

For larger aircraft, the weight and cost impacts of traditional systems aren't substantial, but for smaller systems, such as drones, the addition of the weight and cost of fully redundant system can be significant. This is particularly an issue with lightweight, unmanned systems.

Autonomous systems are generally architected with flight control computer (FCC) that is separated from an autonomy computer (AC) with the intent of protecting flight critical functions in the FCC and allowing less deterministic or lower reliability functions in the AC. Similar to what is shown on the left. An autonomous system may have redundant FCCs, and a separate AC, with the AC providing higher level control than the FCC, and one FCC acting as a standby for a primary FCC. However, use of a second FCC in standby mode doubles the weight and cost of the overall FCC system.

Additionally, autonomous systems generally manage sensor redundancy through a mixture of multiplicity of hardware and diversity of hardware. The space, cost, weight and power of those redundant FCC components can become prohibitive, particularly on smaller air vehicles.

SUMMARY

An embodiment flight control system for an aircraft includes a flight control computer (FCC) configured for providing at least a first flight function and a second flight function, sending, to one or more effectors of the aircraft, first command signals based at least in part on the first flight function and the second flight function, where the one or more or more effectors are associated with control of flight characteristics of the aircraft, and a second computer, configured for providing, as a primary function, one or more non-flight critical functions associated with operation of the aircraft, where the one or more non-flight critical functions are different from the first flight function and the second flight function, monitoring operation of the FCC, determining whether the FCC has failed, and providing a fail-safe mode for at least the first flight function in response to determining that the FCC has failed. Providing the fail-safe mode includes providing one or more critical flight functions, where the first flight function is a critical flight function of the one or more critical flight functions, and sending, to the one or more effectors, second command signals based at least in part on the one or more critical flight functions, where the second command signals replace at least one first command signal that is associated with the first flight function.

An embodiment system includes at least one processor, and at least one non-transitory computer readable medium storing thereon computer program code for as a backup system for a flight control computer (FCC) in a flight control system of an aircraft, where the computer program code includes instructions for providing, as a primary function, one or more non-flight critical functions associated with operation of the aircraft, where the one or more non-flight critical functions are different from a first flight function and a second flight function provided by the FCC, where the first flight function is one of a flight stabilization function or a rate feedback augmentation, and where the second flight function is one of a guidance or tracking task, monitoring operation of the FCC, determining whether the FCC has failed, and performing, in response to determining that the FCC has failed, at least providing one or more critical flight functions, where providing the one or more critical flight functions includes providing a first critical flight function that is analogous to the first flight function, and further includes omitting performance of the second flight function and sending, to one or more effectors of the aircraft, second command signals based at least in part on the one or more critical flight functions, where the second command signals replace at least one first command signal that is sent by the FCC and that associated with the first flight function. In some embodiments, the instructions for monitoring operation of the FCC include instructions for monitoring messages sent by the FCC. In some embodiments, the instructions for determining whether the FCC has failed include instructions for determining that the FCC has failed in response to the FCC failing to send a message within a predetermined time. In some embodiments, the instructions for determining whether the FCC has failed include instructions for determining that the FCC has failed in response to determining that the FCC has transmitted one or more invalid messages. In some embodiments, the instructions for determining whether the FCC has failed include instructions for sending a flight function takeover message to the FCC, and performing at least one of determining that the FCC has failed in response to one of the FCC failing respond to the flight function takeover message, or the FCC responding with a response other than a flight function takeover rejection message, or determining that the FCC has not failed in response to one of the FCC responding with a flight function takeover rejection message. In some embodiments, the instructions for providing one or more critical flight functions include instructions for starting the critical flight functions and assigning the critical flight functions a higher priority for processing or resources than a priority assigned to the one or more non-flight critical functions, where the computer program code further incudes instructions for reducing processing of the one or more non-flight critical functions.

An embodiment method includes providing, by a second computer acting as a backup system for a flight control computer (FCC) of a flight control system for an aircraft and as a primary function, one or more non-flight critical functions associated with operation of the aircraft, where the one or more non-flight critical functions are different from a first flight function and a second flight function provided by the FCC, where the first flight function is one of a flight stabilization function or a rate feedback augmentation, and where the second flight function is one of a guidance or tracking task, monitoring operation of the FCC, determining whether the FCC has failed, and performing, in response to determining that the FCC has failed, at least providing one or more critical flight functions, where providing the one or more critical flight functions includes providing a first critical flight function that is analogous to the first flight function, and further includes omitting performance of the second flight function, and sending, to one or more effectors pf the aircraft, second command signals based at least in part on the one or more critical flight functions, where the second command signals replace at least one first command signal sent by the FCC and that is associated with the first flight function.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the presented principles are directed to avoiding multiplicity of flight critical hardware by repurposing a second computer other than a flight control computer (FCC) to perform at least some of the functionality of an FCC when the FCC is in a failed state. The FCC may a computer that primarily or normally provide flight control functions such as providing flight stability, implementing flight commands from a pilot, providing fly-by wire functions, and the like. The second computer may be another computer that that ordinarily does not perform the flight control functions, but may act as a backup for the FCC. For example, the second compute may provide non-primary flight control functions such as mission processing, sensor fusion, guidance functions, or the like, as a primary function. In some embodiments, the second computer may be referred to as an autonomy computer (AC). The AC may have access to all the flight critical sensors, either though a secondary bus between the sensors and the AC, or a common bus shared with the FCC. When an FCC failure is detected, the AC sheds its autonomous functions and activates a routine that emulates the most basic flight critical functions normally performed by the FCC. The AC then provide the flight commands necessary to safely land the aircraft.

This arrangement exposes flight critical sensor data to both the FCC and the AC. Both the FCC and AC have command and control capability of effectors. However, in some embodiments, the FCC may preclude the backup computer or AC from asserting control, for example, when the FCC determines that it is not in a critical failure state, the FCC may override the AC assumption of control. Thus, when needed, for example in response to an FCC failure, the AC can perform basic or critical FCC functions. Similarly, when needed, for example, in response to an AC failure, the FCC can perform basic autonomous fail-safe features or provide a fail-safe mode.

Figure 1:
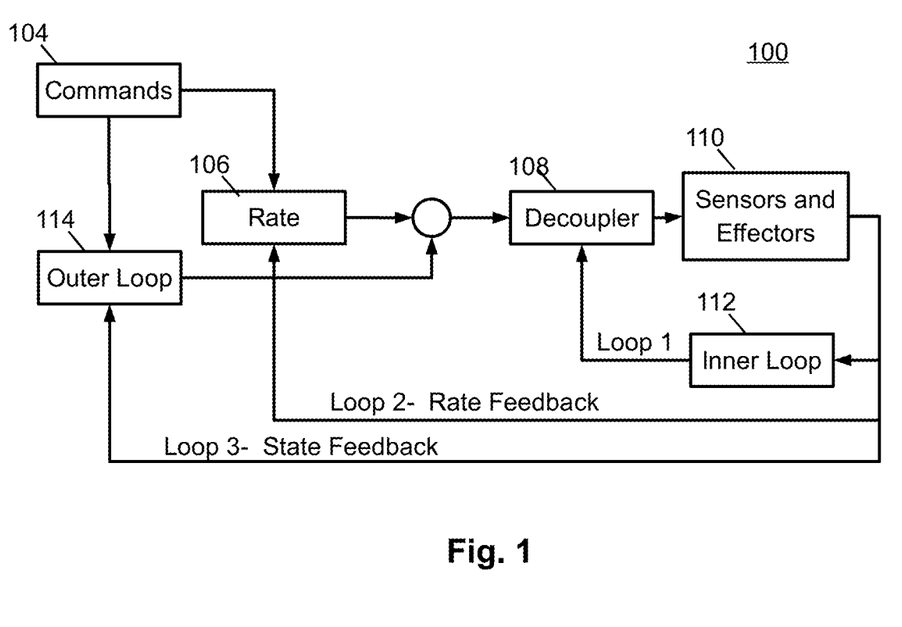
FIG. 1 is a logical diagram illustrating operation of an FCC according to some embodiments.

FIG. 1 is a logical diagram illustrating operation of an FCC 100 according to some embodiments. The FCC 100 may implement FBW functions as a series of inter-related feedback loops running certain control laws. In some embodiments, the FCC uses a three-loop flight control system to permit separation of different flight control with different authorities. In some embodiments, elements of the three-loop flight control system may be implemented at least partially by the FCCs 100, with ACs (not shown here) providing higher level functionality such as navigation, mission management, artificial intelligence agents, object recognition, and the like. However, all, some, or none of the components of three-loop flight control system 201 could be located external or remote from the FCC 100 and communicate to on-board devices.

The three-loop flight control system receives flight commands 104 from, for example, the AC, for from another outside source such as a remote pilot, a fleet or drone management system, or the like. The FCC further implements an outer loop 114, a rate (middle) loop 106, an inner loop 112, a decoupler 108, and aircraft equipment such as sensors, and effectors 110, and the like. For example, the sensors and effectors 110 may correspond to flight control devices such as a swashplate, tail rotor transmission, and the like, to actuators driving the flight control devices, to sensors such as aircraft sensors, position sensors, attitude sensors, motor or battery sensors, and the like, to motor controls, or other motion or attitude control devices.

In the disclosed arrangement, the three-loop design separates the inner stabilization and rate loops or feedback loops from outer guidance and tracking loops. The overall stabilization and related tasks are performed by inner loop 112. The rate loop 106 or middle loop provides rate feedback augmentation. The outer loop 114 focuses on guidance and tracking tasks, such as determining a target location and providing commands to reach the target location from a current location, or the like. Since inner loop 112 and rate loop 106 provide most of the stabilization, less control effort or processing is required at the outer loop level than if a single loop were performing all stabilization, augmentation and guidance and tracking tasks. Additionally, the three loop system permits prioritization of tasks, with higher priority given to lower level loops. Thus, the inner loop 112 may be given highest priority with those tasks performed by the inner loop 112 getting processing resources prior to tasks performed by the rate loop 106 or outer loop 114. Additionally, in some embodiments, outer loop flight augmentation may be turned on and off, for example, when tasks performed by the outer loop 114 are not necessary for flight stabilization.

In some embodiments, the inner loop 112 and rate loop 106 include a set of gains and filters applied to roll/pitch/yaw 3-axis rate gyro and acceleration feedback sensors. Both the inner loop 112 and rate loop 106 may be active and independent of various outer loop hold modes. Outer loop 114 may include cascaded layers of loops, including an attitude loop, a speed loop, a position loop, a vertical speed loop, an altitude loop, and a heading loop. In some embodiments, the control laws the loops as illustrated allow for decoupling of otherwise coupled flight characteristics, which in turn may provide for more stable flight characteristics and reduce processor or control system workload. Furthermore, the outer loop 114 may allow for automated or semi-automated operation of certain high-level tasks or flight patterns, thus further relieving the workload on a remote pilot, processing center of an AC, or the like.

In some embodiments, the inner loop 112 stabilizes the dynamics of the aircraft, the rate loop 106 controls the angular rates of the aircraft, and the outer loop 114 provides control signals to the inner loop 112 and/or rate loops 106 to provide a desired attitude, speed and position of the aircraft. In some embodiments, the outer loop 114 supports and provides flight augmentation or autopilot functionality and may be manually or automatically disabled based on flight and system conditions. The inner loop 112 and rate loops 106, on the other hand, remain operational to provide stability to the aircraft.

Figure 2:
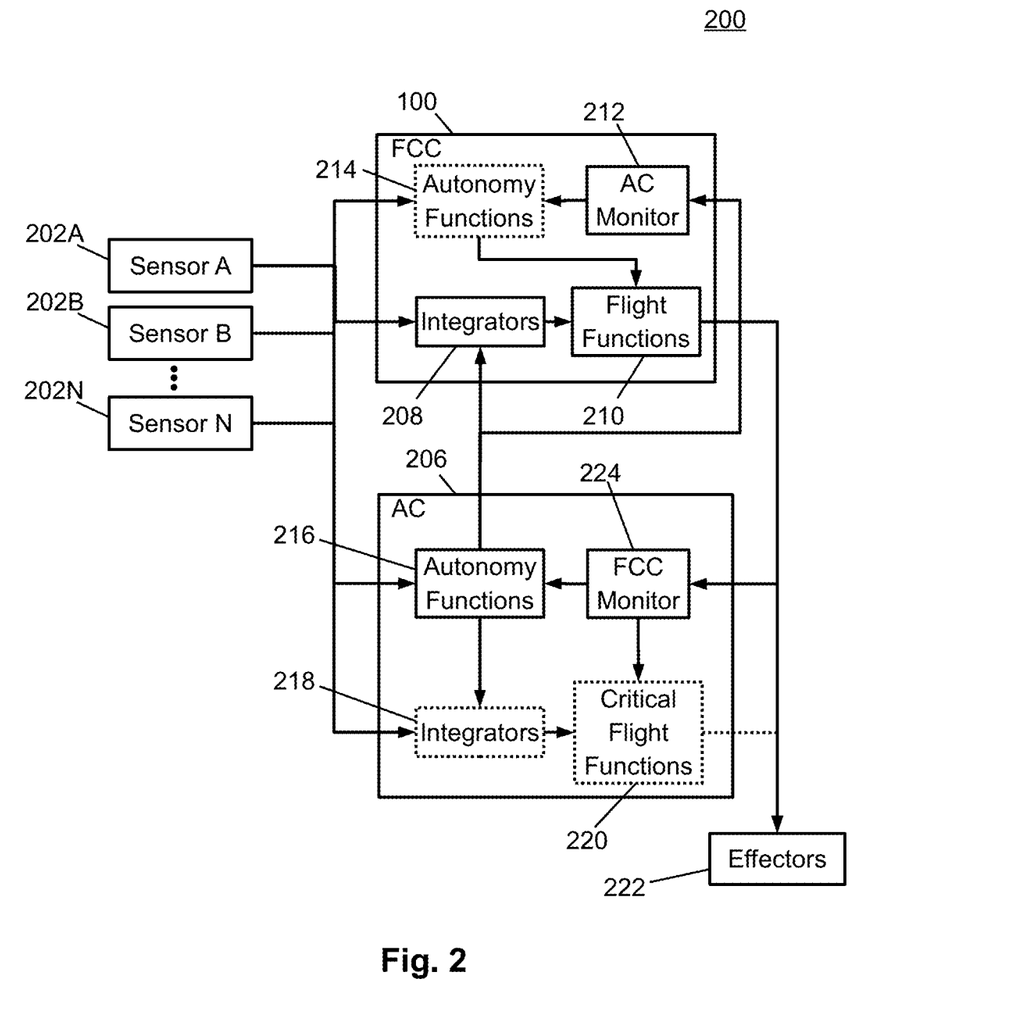
FIG. 2 is a logical diagram illustrating a system with an FCC and AC according to some embodiments.

FIG. 2 is a logical diagram illustrating a system 200 with an FCC 100 and AC 206 according to some embodiments. The system 200 may include multiple sensors 202A-202N connected to both an FCC 100 and an AC 206.

The FCC 100 may implement one or more first integrators 208 that are used for performing flight functions 210. Additionally, in some embodiments, the FCC 100 may have an AC monitor 212 that triggers takeover of autonomy functions 214 in response to the AC monitor 212 determining that the AC 206 has failed or is otherwise not operating properly. In some embodiments, while the AC monitor 212 indicates that the AC 206 is operating properly, the autonomy functions 214 of the FCC may be inactive, or running in the background.

The AC 206 may implement one or more autonomy functions 216, and may have one or more second integrators 218 used by one or more critical flight functions 220. The second integrators 218 associated with critical flight functions 220 of the AC 206 maybe inactive or running in a background mode during normal operation, and may brought to the foreground or used to takeover or provide a fail-safe feature for functionality of the FCC 100 in response to an FCC monitor 224 implemented by the AC 206 indicating a failure by, or other improper operation of, the FCC 100. Thus, the FCC 100 and AC 206 may monitor each other, and may take over at least part of the functionality of the other system if a failure of that other system is detected.

In some embodiments, the FCC 100 and AC 206 are separate computing systems, and may each have separate processors and non-transitory computer readable media with computer program code stored thereon. For example, the FCC 100 may have one or more first processors connected to one or more first computer readable media storing one or more first computer programs with first instructions for implementing one or more of first integrators 208, one or more first flight functions 210, an AC monitor 212, and one or more first autonomy functions 214. Similarly, the AC 206 may have one or more second processors connected to one or more second computer readable media storing one or more second computer programs with second instructions for implementing one or more second autonomy functions 216, an FCC monitor 224, one or more second integrators 218, and one or more critical flight functions 220.

In some embodiments, the FCC 100 may implement one or more flight functions 210. This may include operating the inner loop provide flight stabilization or stabilization of the dynamics of the aircraft, operating the rate loop for rate feedback augmentation, such as controlling the angular rates of the aircraft, and operating the outer loop for guidance and tracking tasks such as providing flight augmentation or automated flight functionality and movement control. Thus, the FCC may implement the outer loop using control loops such as an attitude loop, a speed loop, a position loop, a vertical speed loop, an altitude loop, a heading loop, and the like. The FCC 100 may send one or more flight command signals to one or more effectors 222 to control actuators or other control device for flight control surfaces, motor controllers, or the like. For example, in a vertical takeoff UAV or drone, a flight characteristic, such as flight direction, speed, altitude and attitude may be controlled by differential motor control, such has for a quadcopter, hexacopter, octocopter, or the like, where motors provide the bulk of the lift for an aircraft. The flight characteristics are controlled by motor control, since the nature of flight for a vertical takeoff vehicle tends to have little forward airspeed where a traditional flight control surface such has an elevator, rudder, aileron, or the like, would be effective.

In some embodiments, the first integrators 208 in the FCC 100 may be used as buffers or feedback mechanisms when combining multiple signals, such as combining feedback from aircraft sensors with input command values of the control signal to smooth transitions in input command value changes. Additionally, in some embodiments, the first integrators 208 may be used to track an error determined from feedback from the flight control system and rotorcraft sensors and may to provide gain on the feedback or input command values to adjust processing of inputs to reduce the different between the desired flight characteristic such as a position, speed, attitude, or the like, and the converge the actual flight characteristic reported by sensors and the desired flight characteristic indicated by the input command values. In some embodiments, hold loops may have logical paths that provide output signals based on proportional calculation, for example, of the input command values, and integrator paths that provide for feedback or other control adjustment using the integrators. Additionally, the FCC 100 may use the first integrators 208 as part of a feedback system. In some embodiments, each loop in the outer loop or rate loop may have an integrator that integrates an error determined from feedback from the flight control system and rotorcraft sensors. In some embodiments, the first integrators 208 may be accumulators implemented in software, but may also be hardware devices associated with individual sensor inputs or with specialized processors or the like.

The AC 206 may provide autonomy functions 216 related to performing an assigned mission or task, with the autonomy functions 214 being at higher level than the flight function 210 performed by the FCC. The flight functions 210 of the FCC are more closely related to flying the aircraft, while the autonomy functions 216 are higher level functions more related to providing general instructions to the FCC 100, which are then interpreted in terms of the specific aircraft and specific flight situations. For example, the autonomy functions 216 may have functionality for determining vehicle mission routing, such as determining a vehicle target destination, and determining a valid route, and associated way points, to arrive at a particular location, and may send commands to the FCC 100 to move to a particular location. The FCC 100 may use the flight functions 210 to determine how to move to particular location. For example, the FCC may determine to fly in a particular direction, at a particular airspeed, until the aircraft reaches a particular waypoint destination. The FCC 100 may use first integrators 208 to, for example, determine an error in, or difference between, the aircraft's actual and desired locations, and use the difference as feedback to control, though the rate loop and inner loops, movement of the aircraft.

The sensors 202A-202N may be connected to the FCC and to the AC 206 by, for example, a common bus, or by separate buses. For example, a first sensor 202A may be a fiber optic gyro (FOG)-based inertial measurement unit (IMU) connected to the FCC 100 by a dedicated bus and used for inertial navigation, position measurement, attitude determination, and the like. In some embodiments, the first sensor 202A may be connected to the AC 206 by a separate bus to avoid overall system failure the if the first bus fails. For example, the first sensor 202A may be connected to each of the FCC 100 and the AC 206 by separate a RS-232 connection for redundancy. Additionally, one or more sensors 202A-202N maybe connected to one of the FCC 100 or AC 206 and not connected to the other of the FCC 100 or AC 206. For example, a second sensor 202B may include one or more downward facing cameras, which may be connected to the AC 206, but not connected to the FCC 100, as the FCC 100 may not need camera data to provide the first autonomy functions 214 or flight function 210. In such an example, data from the second sensor 202B or downward facing cameras may be used for object recognition and avoidance, visual location estimation, or the like. Similarly, in some embodiments, a third sensor 202N may be a laser altimeter connected to the FCC 100, but not connected to the AC 206. While the third sensor 202N later altimeter may not be connected to the AC 206, the AC 206 may use sensor fusion, such as a software or hardware process that interpolates data from other sensor inputs, to synthesize data analogous to the data that would be received from the third sensor 202N laser altimeter. Additionally, the sensor fusion used to generate data replacing the third sensor 202N laser altimeter data may be offline until needed, conserving AC processing resources until the AC 206 needs that data, for example, for taking over critical flight functions 220 in response to an FCC 100 failure. For example, the AC 206 may use, for example, data from downward facing cameras to estimate an altitude above ground, but such features may not be used until the AC 206 takes over performance of critical flight functions 220.

The AC 206 may further implement one or more second integrators 218. Maintaining integrators in the AC 206 permits more rapid use of the second integrator 218 when the AC take over critical flight functions 220. In some embodiments, the second integrators 218 may be initialized and held in a frozen or stopped state, which avoids the need to initialize the second integrators 218, but does require that the second integrators 218 receive some live data to catch up to the current state of input command values. This is because the second integrators 218 may use previous input command values or sensor values to generate a smoothed output value, and the second integrators 218 may need to buffer, or acquire, some past data before generating relevant data. However, in other embodiments, the second integrators 2185 may receive data or command input data from relevant sources, and may maintain an integrated value so that the second integrators 218 may be immediately used in case of an FCC 100 failure. Additionally, in some embodiments, the second integrators 218 may be accumulators, and may be implemented in software, or may alternatively, be implemented in hardware depending on design requirements.

In some embodiments, monitoring of the FCC 100 and AC 206 permits the monitoring device to take over one or more pieces of functionality. This arrangement permits use of a single FCC 100 and single AC 206. In, for example, a drone or other autonomous or cargo vehicle where passengers are not present, the requirements for redundancy may be lower than in systems controlling a passenger aircraft due the lower risk of loss of life. For example, an FCC 100 in a rotorcraft may require multiple redundant FCCs 100 separate from any flight computer or similar higher level functionality computers. However, with a drone or autonomous vehicle, the redundancy of the FCC 100 need not be complete, and an AC 206 with less stringent capability requirements may be sufficient to act as a backup for the FCC 100. Generally, the FCC 100 is a highly regulated device with high availability and reliability. In contrast, the availability and reliability requirements for an AC 206 may be lower, reducing the cost of the AC 206 and permitting larger ACs 206 with greater processing power. The greater processing power may be useful for implementing computationally intensive tasks such as object recognition, video or image processing, route calculation, communications, and the like. Thus, an AC 206 may take over critical flight functions 220 of an FCC 100 should the FCC 100 fail. For example, the AC 206 may enter a fail-safe mode by taking over inner loop functionality for stabilizing an aircraft, and may use a limited set of rate loop functions to control movement of the aircraft. This fail-safe mode by the AC 206 may include foregoing or omitting the remaining rate loop or outer loop functions normally provided by the FCC 100. In order to provide sufficient processing power and primacy for critical flight function 220 or authority in processing, the AC 206 may shut down or stop one or more autonomy functions 216, and may, in some embodiments, run a limited set of autonomy functions. For example, if the AC 206 determines that the FCC 100 has failed, the AC 206 may shut down object detection or other non-essential camera functions so that processing for downward facing cameras may be used to backup an altimeter functionality. In another example, the AC 206 may retain some location based services to determine a route to a home location, and may provide route finding to the home location with basic processing, and may provide processing for replacement critical flight functions like flight stability and movement control in conjunction with the route finding autonomous functionality to safely return the aircraft to a home landing pad, or in an extreme emergency, to safely land the aircraft as immediately as possible after the FCC 100 failure. Thus, when in fail-safe mode, the AC 206 may send command signals associated with the critical flight functions 220 to the effectors 222 to replace command signals from the FCC.

In some embodiments, the FCC monitor 224 may receive copies of messages or commands sent by the FCC 100 to the effectors 222, may receive regularly sent messages, such as a heartbeat message or the like, from the FCC 100, may monitor traffic from the FCC 100 to the effectors 222, or may receive another indication that the FCC 100 is alive or has failed. In some embodiments, the FCC monitor 224 may determine that the FCC 100 has failed if the FCC monitor 224 does not receive, within a predetermined time, an expected message indicating that the FCC is operating. In other embodiments, the FCC monitor 224 may determine that the FCC 100 has failed in response to the FCC monitor 224 not detecting messaging within a predetermined time, or in response to the FCC determining one or more invalid messages within a predetermined time. In yet other embodiments, the FCC monitor 224 may determine that the FCC 100 has failed in response to the FCC monitor 224 receiving a failure message from the FCC 100, or from another component, such as the effectors 222. Thus, the effectors 222 may, for example, determine that the FCC 100 has sent one or more bad messages, and may send a message to the FCC monitor 224 indicating failure of the FCC 100.

The FCC 100 may similarly monitor the autonomy functions 216 provided by the FCC 100 to determine whether the AC 206 has failed. The AC monitor 212 may receive copies of messages send to the FCC 100 for the flight functions 210, or may receive all messages from the AC 206 and pass those messages on to the portion of the FCC 100 handling the flight functions 210. In other embodiments, the AC 206 may send a regular message, such as heartbeat message, to the AC monitor 212, or may response to polling or a check message from the FCC 100 op indicate to the FCC that the AC 206 is still working. In yet other embodiments, the AC monitor 212 may check message or communications from the AC 206 to determine whether the AC 206 is sending valid messages, and that the messages are sent in a timely or regular manner.

Figure 3A:
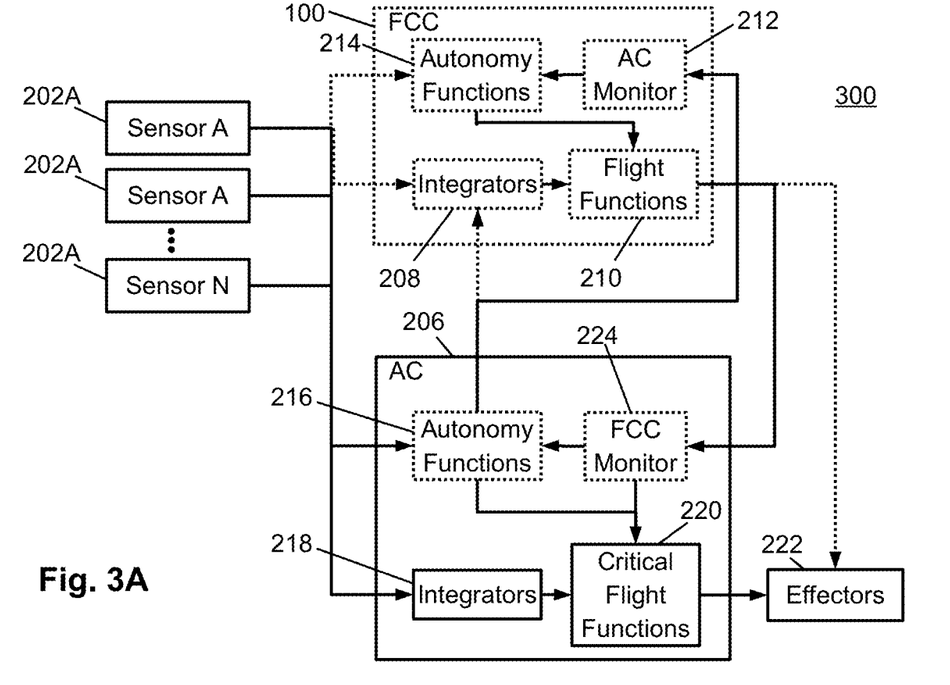
FIGS. 3A-3B are logical diagrams illustrating various implementations of fail-safe features for a system for failed components according to some embodiments.
Figure 3B:
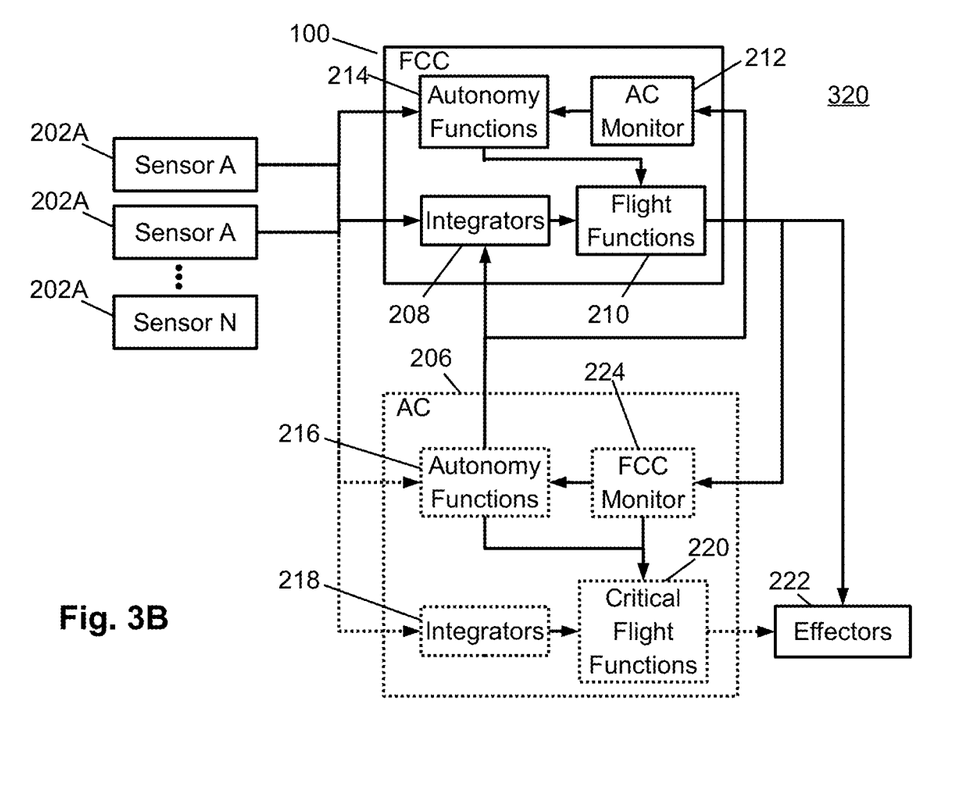

FIGS. 3A-3B are logical diagrams illustrating various implementations of fail-safe features for a system for failed components according to some embodiments. FIG. 3A is a logical diagram illustrating an AC 206 providing a fail-safe arrangement 300 for a failed FCC 100 according to some embodiments. If the FCC monitor 224 of the AC 206 indicates that the FCC 100 has failed, the AC 206 may take over critical flight functions 220. In some embodiments, the AC 206 may cut off the FCC 100 communicating with the effectors 222 in response to the AC 206 taking over the critical flight functions 220 from the FCC 100.

In some embodiments, the AC 206 may require some processing cycles or message frames to give the integrators 218 time to take in data and fill a buffer or otherwise catch up to current conditions. This may be particularly useful where the second integrators 218 are maintained in a frozen, or background state and may not get processing priority that permits the second integrators 218 to maintain a current state when not in use. Thus, the C may start to update the integrators 218 while verifying that the FCC 100 has failed, or while starting the critical flight functions 220.

The AC 206, in response to determining that the FCC 100 has failed, may provide a fail-safe feature for the failed FCC 100 by performing a takeover over for the FCC 100 and taking over at least a portion of the flight functions 210 providing the critical flight functions 220.

In some embodiments, the AC 206 may send a flight function takeover message to the FCC 100 to notify the FCC that the AC 206 is taking over flight functions 210. In some embodiments, the FCC 100 may automatically shut down, reboot, restart, or otherwise permit the AC 206 to at least temporarily provide a fail-safe feature for the FCC 100 by taking over the flight functions 210. In other embodiments, the FCC 100 may send a flight function takeover rejection message to prevent the AC 206 from taking over, which may avoid the AC 206 inadvertently or incorrectly taking over the flight functions 210. In some embodiment, the AC 206 may determine that the FCC 100 has failed if the FCC fails to respond to the flight function takeover message, or responds with something other than a flight function takeover rejection message. Additionally, in other embodiment, the FCC 100 may send a flight function takeover return message that the FCC 100 has rebooted or restarted to take control back or return handling of the flight functions 210 from the AC 206. Thus, the AC 206 may be able to temporarily take control of the flight functions 210 to give the FCC 100 time to correct an error condition.

In other embodiments, the AC 206 may take over providing the flight functions 210 without notifying or otherwise giving the FCC 100 the chance to override the AC 206 takeover. This may avoid a situation where the FCC 100 incorrectly believes it is operating correctly, where the FCC 100 is unaware that messages to the effectors are missing or incorrect, such as an issue with a communications bus from the FCC 100 to the effectors 222, or the like. In such an arrangement, the AC 206 may send a message or control signal to a cutoff switch (not shown) or the like to disconnect the output of the FCC 100 from the effectors 222, may send a message to the effectors 222 or a related system to ignore commands from the FCC 100, may send messages or commands to the effectors 222 with an authority that is higher than authority of messages from the FCC 100, send messages with a takeover indication in the commands or messages sent to the effectors 222, or may use another takeover technique.

In some embodiments, the critical flight functions 220 may be a subset of the flight functions 210 provided by the FCC 100, with the critical flight functions 220 primarily being directed to flight stability or movement control. The AC 206 may, in some embodiments, the critical flight functions 220 may omit support features, guidance, tracking, flight augmentation, and the like that would normally be part of the flight functions 210.

In some embodiments, the AC 206 may provide processing power or resources for the critical flight functions 220 by, for example reducing, or eliminating, handling of at least one of the autonomy functions 216. In some embodiments, the AC 206 may perform only required support autonomy functions 216 during a fail-safe mode or takeover condition. For example, higher autonomy functions such as object recognition, mapping, and the like may be turned off, while a route finding autonomy function may be kept active so that the AC 206 is able to determine a route to a home location, or to a suitable backup or emergency landing space. The critical flight functions 220 and maintained autonomy functions 216 may be predefined functions that are identified before flight so that the AC 206 needs to perform little determination of functions needed during a fail-safe mode. Thus, during a fail-safe mode, critical flight functions 220 may be started by the AC 206, or at least moved from a background to running in the foreground. Additionally, in some embodiments, at least one or more autonomy functions may be stopped or terminated.

In addition to, or instead of, turning off higher autonomy functions, the AC 206 may prioritize processing of the critical flight functions 220 by giving the critical flight functions 220 a higher priority or authority, for example, by giving a the critical flight functions are given a higher processing priority so that the critical flight functions 220 are processed before the autonomy functions 216, or so that the critical flight functions 220 are given processing resources, such as memory or processing cycles before the remaining autonomy functions 216. In some embodiments, all, or substantially all, of the flight functions performed by an FCC may be replicated by the AC during fail-safe operation, and in other embodiments, a limited subset of the flight control functions normally provided by the FCC may be replicated by the AC during the fail-safe process.

FIG. 3B is a logical diagram illustrating an AC 206 providing a fail-safe arrangement 320 for a failed AC 206 according to some embodiments. If the AC monitor 212 of the AC 206 indicates that the AC 206 has failed, the FCC 100 may take over one or more autonomy functions 216. In some embodiments, FCC 100 may perform the autonomy function 216 normally performed by the AC 206 in response to the FCC 100 taking over providing a fail-safe mode for the AC 206.

In some embodiments, the AC monitor 212 may receive messages or commands from the AC 206, and may monitor the timing, accuracy, content or another feature, of the messaging or command signals from the AC 206 to identify when the AC 206 fails or is otherwise not operating property. The FCC 100 may, in response to determining that that AC 206 has failed, may start the autonomy functions 214 in the FCC 100, and may, in some embodiments, send a message to the AC 206 to restart, shut down, disconnect, or otherwise change the AC 206 operational status. In other embodiments, the FCC 100 may, in response to determining that the AC 206 has failed, simply ignore or disregard communications from the AC 206, and use data or commands generated by the autonomy functions 214 running on the FCC 100.

Figure 4:
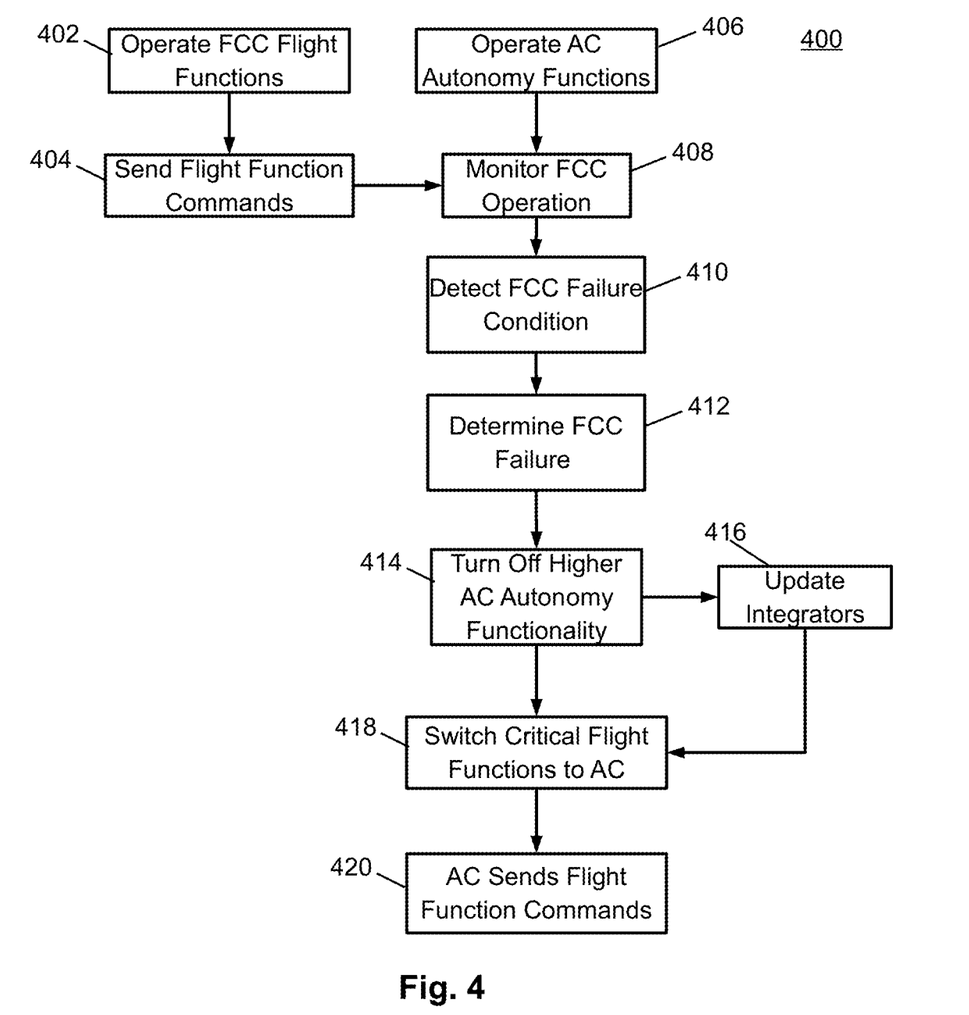
FIG. 4 is a flow diagram illustrating a method for using an AC to back up an FCC according to some embodiments.

FIG. 4 is a flow diagram illustrating a method 400 for using an AC to back up an FCC according to some embodiments. In block 402, an FCC operating FCC flight functions. Operating the FCC flight functions may, in some embodiments, include providing at least a first flight function and a second flight function. The first flight function may be one of a flight stabilization function or a rate feedback augmentation, for example, from an inner loop or from a rate or middle loop. The second flight function may be one of a guidance or tracking task from, for example, the outer loops. In block 404, the FCC may send flight function commands to, for example, one or more effectors are associated with control of flight characteristics of an aircraft. In some embodiments, the flight function commands are first command signals that are based, at least in part, on the first flight function and the second flight function.

In block 406, an AC operations one or more AC autonomy functions. Operating the AC autonomy functions may include providing one or more autonomy functions associated with operation of the aircraft. In some embodiments, the one or more autonomy functions are associated with determining vehicle mission routing. Additionally, the one or more autonomy functions may, in some embodiments, be different from the first flight function and the second flight function. Thus, the AC and FCC may be separate devices with different primary purposes that provide different functionality in normal operation.

In block 408, the AC monitors FCC operation. In some embodiments, the AC may monitor messages or message traffic from the FCC, including monitoring the timeliness or content of one or more communications, messages, signals, or the like, sent by the FCC. In some embodiments, the AC may monitor copies of messages sent to the FCC, and in other embodiments, the AC may monitor traffic between the FCC and one or more effectors or other destination devices. In yet other embodiments, the AC may monitor messages sent specifically to the AC by the FCC, such as heartbeat or regular check-in messages indicating that the FCC is active or operating normally, an error message indicating that the FCC has failed, or the like. In block 310, the AC may detect an FCC failure condition. Detecting the FCC failure condition may include determining whether the FCC has failed. In some embodiments, Detecting the FCC failure condition includes determining that the FCC has failed in response to the FCC failing to send a message within a predetermined time. This may include detecting that the FCC has failed to send a control message or flight function command within the predetermined time, or that the FCC has failed to send a heartbeat or check-in message within the predetermined time. In other embodiments, Detecting the FCC failure condition includes determining that the FCC has failed in response to detecting that the FCC has transmitted one or more invalid messages.

In block 412, the AC may determine an FCC failure. Determining the FCC failure may include verifying the FCC failure, and may include checking in with the FCC to verify the failure with the FCC. In some embodiments, determining that the FCC has failed may include sending a flight function takeover message to the FCC, determining whether the FCC rejects the failover. Thus, the AC may determine that the FCC has failed in response to one of the FCC failing respond to the flight function takeover message, or the FCC responding with a response other than a flight function takeover rejection message. Conversely, the AC may determine that the FCC has not failed in response to one of the FCC responding with a flight function takeover rejection message.

In some embodiments, the AC may provide a fail-safe mode in response to determining that the FCC has failed. Providing the fail-safe mode may include providing a fail-safe mode or fail-safe feature for at least the first flight function in response to determining that the FCC has failed. As part of providing the fail-safe mode, the FCC may, in block 414, turn off higher AC autonomy functionality. This may, in some embodiments, include reducing processing of the one or more autonomy functions, stopping or turning off one or more autonomy functions, or the like. In other embodiments, the AC may maintain processing of the autonomy functions normally provided b threw AC, and may further provide one or more critical flight functions.

In block 416, the AC may update one or more integrators. Updating the integrators may include permitting the integrators in the AC to receive data for inclusion a buffer, accumulator, or value storage to update a value of an integrator and bring then integrator value in lie with real-time conditions.

In block 418, critical flight functions are withed to the AC. In some embodiments, the AC provides one or more critical flight functions, with the first flight function provided by the FCC being reproduced, copied, or included in the critical flight functions provided by the AC. The critical flight functions implemented by the AC as part of the fail-safe mode may include a first critical flight function that is analogous to the first flight function, and may include omitting performance of the second flight function. Thus, in a fail-safe mode, the AC may perform a limited subset of the flight functions provided by the FCC during normal operation. In some embodiments, providing one or more critical flight functions by the AC comprises starting the critical flight functions in the AC and assigning the critical flight functions a higher priority for processing or resources than a priority assigned to the one or more autonomy functions. Thus, in some embodiments, the AC may maintain processing of one or more autonomy functions, but may prioritize processing of critical flight functions over processing of the autonomy functions.

In block 420, the AC send flight function commands to one or more effectors. The flight function commands may be second command signals based at least in part on the one or more critical flight functions. The second command signals replace at least one first command signal that is associated with the first flight function.

An embodiment flight control system for an aircraft includes a flight control computer (FCC) configured for providing at least a first flight function and a second flight function, sending, to one or more effectors of the aircraft, first command signals based at least in part on the first flight function and the second flight function, where the one or more or more effectors are associated with control of flight characteristics of the aircraft, and a second computer, configured for providing, as a primary function, one or more non-flight critical functions associated with operation of the aircraft, where the one or more non-flight critical functions are different from the first flight function and the second flight function, monitoring operation of the FCC, determining whether the FCC has failed, and providing a fail-safe mode for at least the first flight function in response to determining that the FCC has failed. Providing the fail-safe mode includes providing one or more critical flight functions, where the first flight function is a critical flight function of the one or more critical flight functions, and sending, to the one or more effectors, second command signals based at least in part on the one or more critical flight functions, where the second command signals replace at least one first command signal that is associated with the first flight function.

In some embodiments, the first flight function is one of a flight stabilization function or a rate feedback augmentation, where the second flight function is one of a guidance or tracking task, and where the one or more non-flight critical functions are associated with determining vehicle mission routing. In some embodiments, the monitoring operation of the FCC includes monitoring messages sent by the FCC. In some embodiments, the determining whether the FCC has failed includes determining that the FCC has failed in response to the FCC failing to send a message within a predetermined time. In some embodiments, the determining whether the FCC has failed includes determining that the FCC has failed in response to detecting that the FCC has transmitted one or more invalid messages. In some embodiments, the determining whether the FCC has failed includes sending a flight function takeover message to the FCC, and performing at least one of determining that the FCC has failed in response to one of the FCC failing respond to the flight function takeover message, or the FCC responding with a response other than a flight function takeover rejection message, or determining that the FCC has not failed in response to one of the FCC responding with a flight function takeover rejection message. In some embodiments, providing one or more critical flight functions includes starting the critical flight functions and assigning the critical flight functions a higher priority for processing or resources than a priority assigned to the one or more non-flight critical functions. In some embodiments, providing one or more critical flight functions includes providing a first critical flight function that is analogous to the first flight function, and further includes omitting performance of the second flight function, where the providing the fail-safe mode further includes reducing processing of the one or more non-flight critical functions.

An embodiment system includes at least one processor, and at least one non-transitory computer readable medium storing thereon computer program code for as a backup system for a flight control computer (FCC) in a flight control system of an aircraft, where the computer program code includes instructions for providing, as a primary function, one or more non-flight critical functions associated with operation of the aircraft, where the one or more non-flight critical functions are different from a first flight function and a second flight function provided by the FCC, where the first flight function is one of a flight stabilization function or a rate feedback augmentation, and where the second flight function is one of a guidance or tracking task, monitoring operation of the FCC, determining whether the FCC has failed, and performing, in response to determining that the FCC has failed, at least providing one or more critical flight functions, where providing the one or more critical flight functions includes providing a first critical flight function that is analogous to the first flight function, and further includes omitting performance of the second flight function and sending, to one or more effectors of the aircraft, second command signals based at least in part on the one or more critical flight functions, where the second command signals replace at least one first command signal that is sent by the FCC and that associated with the first flight function. In some embodiments, the instructions for monitoring operation of the FCC include instructions for monitoring messages sent by the FCC. In some embodiments, the instructions for determining whether the FCC has failed include instructions for determining that the FCC has failed in response to the FCC failing to send a message within a predetermined time. In some embodiments, the instructions for determining whether the FCC has failed include instructions for determining that the FCC has failed in response to determining that the FCC has transmitted one or more invalid messages. In some embodiments, the instructions for determining whether the FCC has failed include instructions for sending a flight function takeover message to the FCC, and performing at least one of determining that the FCC has failed in response to one of the FCC failing respond to the flight function takeover message, or the FCC responding with a response other than a flight function takeover rejection message, or determining that the FCC has not failed in response to one of the FCC responding with a flight function takeover rejection message. In some embodiments, the instructions for providing one or more critical flight functions include instructions for starting the critical flight functions and assigning the critical flight functions a higher priority for processing or resources than a priority assigned to the one or more non-flight critical functions, where the computer program code further incudes instructions for reducing processing of the one or more non-flight critical functions.

An embodiment method includes providing, by a second computer acting as a backup system for a flight control computer (FCC) of a flight control system for an aircraft and as a primary function, one or more non-flight critical functions associated with operation of the aircraft, where the one or more non-flight critical functions are different from a first flight function and a second flight function provided by the FCC, where the first flight function is one of a flight stabilization function or a rate feedback augmentation, and where the second flight function is one of a guidance or tracking task, monitoring operation of the FCC, determining whether the FCC has failed, and performing, in response to determining that the FCC has failed, at least providing one or more critical flight functions, where providing the one or more critical flight functions includes providing a first critical flight function that is analogous to the first flight function, and further includes omitting performance of the second flight function, and sending, to one or more effectors pf the aircraft, second command signals based at least in part on the one or more critical flight functions, where the second command signals replace at least one first command signal sent by the FCC and that is associated with the first flight function.

In some embodiments, monitoring operation of the FCC includes monitoring messages sent by the FCC. In some embodiments, determining whether the FCC has failed includes determining that the FCC has failed in response to the FCC failing to send a message within a predetermined time. In some embodiments, determining whether the FCC has failed includes determining that the FCC has failed in response to determining that the FCC has transmitted one or more invalid messages. In some embodiments, determining whether the FCC has failed includes sending a flight function takeover message to the FCC, and performing at least one of determining that the FCC has failed in response to one of the FCC failing respond to the flight function takeover message, or the FCC responding with a response other than a flight function takeover rejection message, or determining that the FCC has not failed in response to one of the FCC responding with a flight function takeover rejection message. In some embodiments, providing one or more critical flight functions includes starting the critical flight functions and assigning the critical flight functions a higher priority for processing or resources than a priority assigned to the one or more non-flight critical functions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A flight control system for an aircraft, comprising:
a flight control computer (FCC) configured for:
providing at least a first flight function and a second flight function;
sending, to one or more effectors of the aircraft, first command signals based at least in part on the first flight function and the second flight function, wherein the one or more effectors are associated with control of flight characteristics of the aircraft; and
a second computer, configured for:
providing, as a primary function, one or more non-flight critical functions associated with operation of the aircraft, wherein the one or more non-flight critical functions are different from the first flight function and the second flight function;
monitoring operation of the FCC;
determining whether the FCC has failed; and
providing a fail-safe mode for at least the first flight function in response to determining that the FCC has failed, wherein the providing the fail-safe mode comprises:
providing one or more critical flight functions, wherein the first flight function is a critical flight function of the one or more critical flight functions; and
sending, to the one or more effectors, second command signals based at least in part on the one or more critical flight functions, wherein the second command signals replace at least one first command signal that is associated with the first flight function.

2. The flight control system of claim 1, wherein the first flight function is one of a flight stabilization function or a rate feedback augmentation, wherein the second flight function is one of a guidance or tracking task, and wherein the one or more non-flight critical functions are associated with determining vehicle mission routing.

3. The flight control system of claim 1, wherein the monitoring operation of the FCC comprises monitoring messages sent by the FCC.

4. The flight control system of claim 3, wherein the determining whether the FCC has failed comprises determining that the FCC has failed in response to the FCC failing to send a message within a predetermined time.

5. The flight control system of claim 3, wherein the determining whether the FCC has failed comprises determining that the FCC has failed in response to detecting that the FCC has transmitted one or more invalid messages.

6. The flight control system of claim 1, wherein the determining whether the FCC has failed comprises:
sending a flight function takeover message to the FCC; and
performing at least one of:
determining that the FCC has failed in response to one of the FCC failing to respond to the flight function takeover message, or the FCC responding with a response other than a flight function takeover rejection message; or
determining that the FCC has not failed in response to one of the FCC responding with a flight function takeover rejection message.

7. The flight control system of claim 1, wherein the providing one or more critical flight functions comprises starting the critical flight functions and assigning the critical flight functions a higher priority for processing or resources than a priority assigned to the one or more non-flight critical functions.

8. The flight control system of claim 1, wherein the providing one or more critical flight functions comprises providing a first critical flight function that is analogous to the first flight function, and further comprises omitting performance of the second flight function; and
wherein the providing the fail-safe mode further comprises reducing processing of the one or more non-flight critical functions.

9. A system, comprising:
at least one processor; and
at least one non-transitory computer readable medium storing thereon computer program code for performing as a backup system for a flight control computer (FCC) in a flight control system of an aircraft, wherein the computer program code includes instructions for:
providing, as a primary function, one or more non-flight critical functions associated with operation of the aircraft, wherein the one or more non-flight critical functions are different from a first flight function and a second flight function provided by the FCC, wherein the first flight function is one of a flight stabilization function or a rate feedback augmentation, and wherein the second flight function is one of a guidance or tracking task;
monitoring operation of the FCC;
determining whether the FCC has failed; and
performing, in response to determining that the FCC has failed, at least:
providing one or more critical flight functions, wherein providing the one or more critical flight functions comprises providing a first critical flight function that is analogous to the first flight function, and further comprises omitting performance of the second flight function; and
sending, to one or more effectors of the aircraft, second command signals based at least in part on the one or more critical flight functions, wherein the second command signals replace at least one first command signal that is sent by the FCC and that is associated with the first flight function.

10. The system of claim 9, wherein the instructions for monitoring operation of the FCC include instructions for monitoring messages sent by the FCC.

11. The system of claim 10, wherein the instructions for determining whether the FCC has failed include instructions for determining that the FCC has failed in response to the FCC failing to send a message within a predetermined time.

12. The system of claim 10, wherein the instructions for determining whether the FCC has failed include instructions for determining that the FCC has failed in response to determining that the FCC has transmitted one or more invalid messages.

13. The system of claim 9, wherein the instructions for determining whether the FCC has failed include instructions for:
sending a flight function takeover message to the FCC; and
performing at least one of:
determining that the FCC has failed in response to one of the FCC failing to respond to the flight function takeover message, or the FCC responding with a response other than a flight function takeover rejection message; or
determining that the FCC has not failed in response to one of the FCC responding with a flight function takeover rejection message.

14. The system of claim 9, wherein the instructions for providing one or more critical flight functions include instructions for starting the critical flight functions and assigning the critical flight functions a higher priority for processing or resources than a priority assigned to the one or more non-flight critical functions; and
wherein the computer program code further includes instructions for reducing processing of the one or more non-flight critical functions.

15. A method, comprising:
providing, by a second computer acting as a backup system for a flight control computer (FCC) of a flight control system for an aircraft, and as a primary function, one or more non-flight critical functions associated with operation of the aircraft, wherein the one or more non-flight critical functions are different from a first flight function and a second flight function provided by the FCC, wherein the first flight function is one of a flight stabilization function or a rate feedback augmentation, and wherein the second flight function is one of a guidance or tracking task;
monitoring operation of the FCC;
determining whether the FCC has failed; and
performing, in response to determining that the FCC has failed, at least:
providing one or more critical flight functions, wherein providing the one or more critical flight functions comprises providing a first critical flight function that is analogous to the first flight function, and further comprises omitting performance of the second flight function; and
sending, to one or more effectors of the aircraft, second command signals based at least in part on the one or more critical flight functions, wherein the second command signals replace at least one first command signal that is sent by the FCC and that is associated with the first flight function.

16. The method of claim 15, wherein the monitoring operation of the FCC comprises monitoring messages sent by the FCC.

17. The method of claim 16, wherein the determining whether the FCC has failed comprises determining that the FCC has failed in response to the FCC failing to send a message within a predetermined time.

18. The method of claim 16, wherein the determining whether the FCC has failed comprises determining that the FCC has failed in response to determining that the FCC has transmitted one or more invalid messages.

19. The method of claim 15, wherein the determining whether the FCC has failed comprises:
sending a flight function takeover message to the FCC; and
performing at least one of:
determining that the FCC has failed in response to one of the FCC failing to respond to the flight function takeover message, or the FCC responding with a response other than a flight function takeover rejection message; or
determining that the FCC has not failed in response to one of the FCC responding with a flight function takeover rejection message.

20. The method of claim 15, wherein the providing one or more critical flight functions comprises starting the critical flight functions and assigning the critical flight functions a higher priority for processing or resources than a priority assigned to the one or more non-flight critical functions.

* * * * *